(12) United States Patent
Kuttenkuler et al.

(10) Patent No.: US 10,384,559 B2
(45) Date of Patent: Aug. 20, 2019

(54) SYSTEM AND METHOD FOR MOTOR SYSTEM CONTROL

(71) Applicant: GENERAL ELECTRIC COMPANY, Schenectady, NY (US)

(72) Inventors: Jason Daniel Kuttenkuler, Erie, PA (US); Henry Todd Young, Erie, PA (US); Jeffrey John Wolff, Lawrence Park, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 204 days.

(21) Appl. No.: 15/520,688

(22) PCT Filed: Oct. 22, 2015

(86) PCT No.: PCT/US2015/056864
§ 371 (c)(1),
(2) Date: Apr. 20, 2017

(87) PCT Pub. No.: WO2016/065119
PCT Pub. Date: Apr. 28, 2016

(65) Prior Publication Data
US 2019/0009691 A1   Jan. 10, 2019

Related U.S. Application Data

(60) Provisional application No. 62/067,218, filed on Oct. 22, 2014.

(51) Int. Cl.
*H02P 27/06* (2006.01)
*H02P 5/74* (2006.01)
(Continued)

(52) U.S. Cl.
CPC ......... *B60L 15/2045* (2013.01); *B60W 10/08* (2013.01); *B60W 20/00* (2013.01);
(Continued)

(58) Field of Classification Search
USPC ........... 290/40 C; 307/9.1, 10.1; 318/400.02; 180/65.25
See application file for complete search history.

(56) References Cited

U.S. PATENT DOCUMENTS 5,446,362 A * 8/1995 Vanek ........................ B60L 3/00
318/801
5,844,344 A * 12/1998 Uetake ................... H02K 1/276
310/156.49

(Continued)

FOREIGN PATENT DOCUMENTS

JP    2006-101587 A    4/2006
JP    2010-104139 A    5/2010

OTHER PUBLICATIONS

International Search Report and Written Opinion issued in connection with corresponding PCT Application No. PCT/US2015/056864 dated Feb. 29, 2016.

(Continued)

*Primary Examiner* — Pedro J Cuevas
(74) *Attorney, Agent, or Firm* — Philip S. Hof; The Small Patent Law Group, LLC

(57) ABSTRACT

A method includes selecting a link voltage based on voltage efficiencies of components in an electric drive motor system, and applying the link voltage to an inverter electrically coupled to a drive motor to increase system efficiency.

20 Claims, 3 Drawing Sheets

(51) Int. Cl.
*H02P 27/08* (2006.01)
*B60L 15/20* (2006.01)
*B60W 10/08* (2006.01)
*B60W 20/00* (2016.01)

(52) U.S. Cl.
CPC .............. *H02P 5/74* (2013.01); *H02P 27/06* (2013.01); *H02P 27/08* (2013.01); *B60L 2220/42* (2013.01); *B60L 2240/527* (2013.01); *Y02T 10/644* (2013.01); *Y02T 10/645* (2013.01); *Y02T 10/646* (2013.01); *Y02T 10/7283* (2013.01)

(56) References Cited

U.S. PATENT DOCUMENTS

| | | | |
|---|---|---|---|
| 5,907,194 A | 5/1999 | Schenk et al. | |
| 5,969,498 A * | 10/1999 | Cooke | H02P 27/08 318/799 |
| 6,034,458 A * | 3/2000 | Uetake | H02K 1/276 310/156.49 |
| 6,847,187 B2 * | 1/2005 | Kumar | H02H 7/0852 318/471 |
| 6,965,212 B1 * | 11/2005 | Wang | H02P 21/06 318/700 |
| 7,185,591 B2 * | 3/2007 | Kumar | B60K 6/28 105/35 |
| 7,325,498 B2 * | 2/2008 | Kumar | B60K 6/28 105/35 |
| 7,669,534 B2 * | 3/2010 | Kumar | B60K 6/28 104/289 |
| 7,893,637 B2 * | 2/2011 | Suhama | B60L 7/16 318/376 |
| 8,025,115 B2 * | 9/2011 | King | B60L 7/06 180/65.1 |
| 9,350,279 B2 * | 5/2016 | Kim | H02P 6/08 |
| 9,461,475 B2 * | 10/2016 | Koukkari | B60L 11/123 |
| 10,171,022 B2 * | 1/2019 | Kim | F24F 13/14 |
| 10,236,803 B2 * | 3/2019 | Rogers | H02P 6/08 |
| 10,272,788 B2 * | 4/2019 | Huh | B60L 50/50 |
| 2003/0111976 A1 * | 6/2003 | Kumar | H02H 7/0852 318/783 |
| 2004/0201359 A1 * | 10/2004 | Kumar | H02H 7/0852 318/783 |
| 2004/0238243 A1 | 12/2004 | King et al. | |
| 2005/0005814 A1 * | 1/2005 | Kumar | B60K 6/28 105/35 |
| 2007/0144398 A1 * | 6/2007 | Kumar | B60K 6/28 105/50 |
| 2007/0145918 A1 * | 6/2007 | Kumar | B60K 6/28 318/139 |
| 2008/0296970 A1 * | 12/2008 | Donnelly | B60L 7/06 307/9.1 |
| 2008/0315684 A1 * | 12/2008 | Cheng | H02J 3/1814 307/45 |
| 2014/0375234 A1 * | 12/2014 | Kim | H02P 6/08 318/400.02 |
| 2015/0102667 A1 * | 4/2015 | Zhao | B60L 11/1803 307/10.1 |
| 2016/0052423 A1 * | 2/2016 | Zhou | B60L 15/06 701/22 |
| 2018/0034403 A1 * | 2/2018 | Kim | F24F 13/14 |
| 2019/0115840 A1 * | 4/2019 | Li | H02M 7/7575 |

OTHER PUBLICATIONS

International Preliminary Report on Patentability issued in connection with corresponding PCT Application No. PCT/US2015/056864 dated Apr. 25, 2017.

\* cited by examiner

SYSTEM AND METHOD FOR MOTOR SYSTEM CONTROL

CROSS-REFERENCE TO RELATED APPLICATION

This application claims the benefit of U.S. Provisional Application No. 62/067,218, filed Oct. 22, 2014, entitled "SYSTEM AND METHODS FOR OPTIMIZING FUEL CONSUMPTION." which is hereby incorporated by reference in its entirety.

BACKGROUND

Technical Field

Embodiments of the invention relate generally to motor system control, such as in a vehicle.

Discussion of Art

In the mining industry, large off-highway vehicles, "OHVs", may employ electrically motorized wheels for propelling or retarding the vehicle. In particular, OHVs typically include a large horsepower diesel engine in conjunction with an alternator, a traction inverter, and wheel drive assemblies housed within the rear tires of the vehicle. In operation, the diesel engine drives the alternator, which powers the traction inverter. The traction inverter includes semiconductor power switches that commutate the alternator output current to provide electrical power to electric drive motors, e.g., AC motors, of the wheel drive assemblies.

Such systems also include controllers and software that set the voltage passed to the traction inverters. This voltage, referred to as a "link voltage" is the main system variable in determining the operating mode and efficiency of the alternator, traction inverter, and traction motor. Link voltages typically vary based solely on the OHV motor speed and do not take into consideration factors such as ambient conditions.

As will be appreciated, changing the link voltage, however, can alter the fuel consumption of the system. It may therefore be desirable to provide a system and method that differ from existing systems and methods, for motor system control to reduce fuel consumption.

BRIEF DESCRIPTION

In one embodiment, a method is provided (e.g., a method of motor system control). The method includes selecting a link voltage based on voltage efficiencies of components in an electric drive motor system, and applying the link voltage to an inverter electrically coupled to a drive motor to increase system efficiency (e.g., increase relative to using a link voltage that is not selected based on voltage efficiencies of components in the electric drive motor system). The method may be carried out by one or more electrical components of the electric drive motor system, such as a controller.

In an embodiment, a method includes selecting a link voltage based on one or more ambient conditions of an electric drive motor system and applying the link voltage to an inverter electrically coupled to a drive motor to increase system efficiency.

In an embodiment, a method includes selecting (e.g., periodically selecting) a link voltage based on one or more efficiency parameters of an electric drive motor system, applying the link voltage that is selected to an inverter of the system, and changing an operating mode of the inverter in response to the application of the selected link voltage.

In an embodiment, an electric drive motor system includes a controller configured to select (e.g., periodically select) a link voltage based on one or more efficiency parameters of the system. The system further includes an inverter electrically coupled to the controller and to a motor. The inverter is configured to receive the link voltage that is selected. At least one of the inverter or the controller is configured to change an operating mode of the inverter in response to application of the link voltage that is selected (e.g., the controller may control the inverter to change operating modes, or the inverter may itself change operating modes). For example, the inverter may be switched between pulse width modulation and square wave modulation to increase system efficiency.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
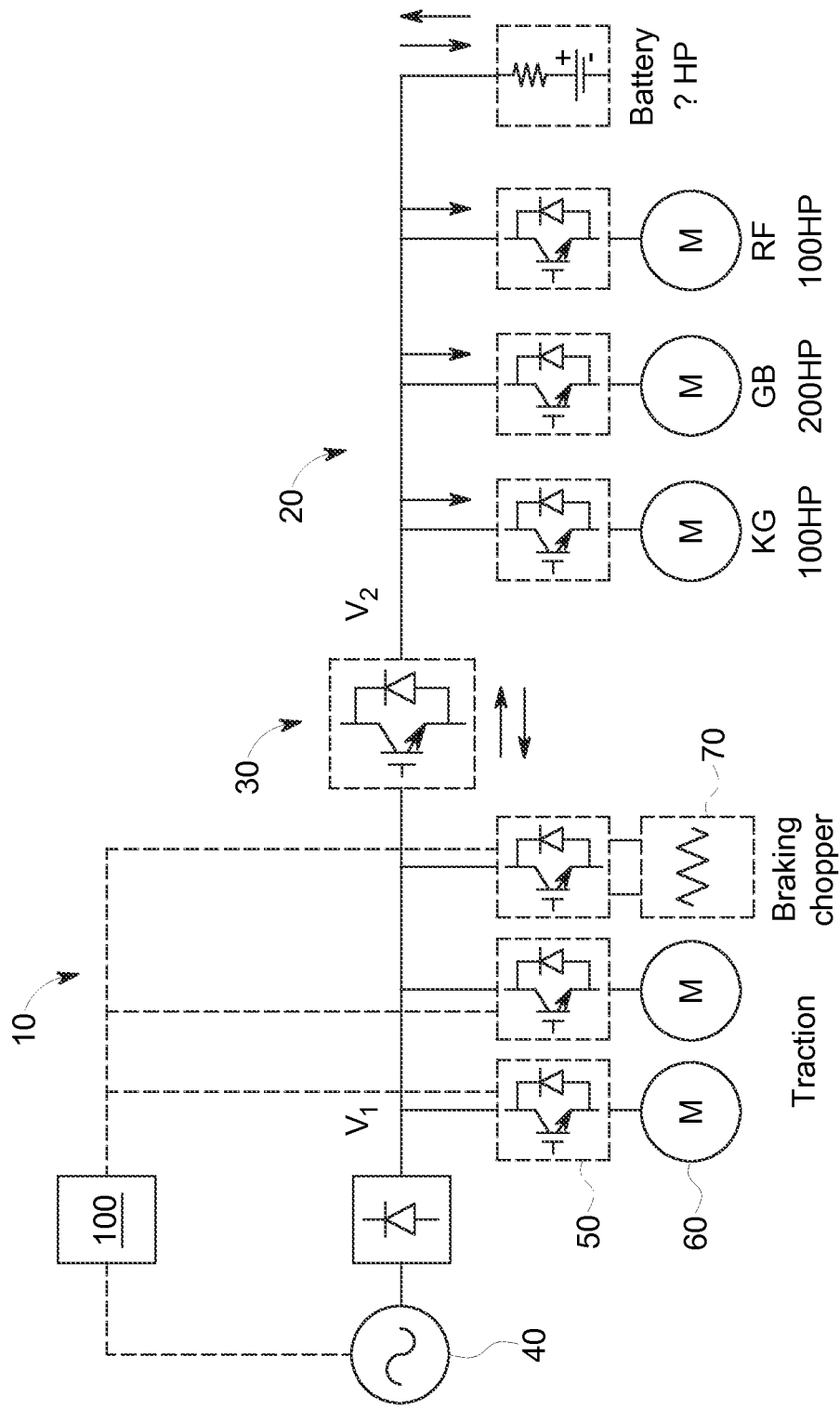
FIG. 1 is a simplified schematic diagram of a system, which may be used with embodiments of the present invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use with both mobile and stationary implementations, for ease of explanation a mobile implementation is described in detail herein. More specifically, an OHV has been selected for clarity of illustration for the disclosure of mobile embodiments. Other suitable vehicles include, for example, on-road vehicles, locomotives, construction equipment, industrial equipment, and marine vessels. As used herein, "operating mode" refers to power control modes of an inverter and includes, but is not limited to, pulse width and square wave modulations.

Referring now to FIG. 1, embodiments of a system are configured for use with a motive machine such as an OHV or other vehicle. In these embodiments, the system generally includes a primary DC link 10 and a secondary DC link 20. The links 10, 20 are electrically coupled to a converter 30, e.g., a DC/DC converter, which steps down voltage from the primary link 10 to the secondary link 20. As shown, the primary link 10 is connected to a power source 40. e.g., an engine- or other prime mover-driven alternator, which powers the system. The primary link 10 includes multiple traction inverters 50 that are coupled to one or more traction motors 60 (also referred to as drive motors) and a braking chopper 70.

As mentioned, the DC/DC converter 30 steps down the first link voltage V1. In an embodiment, the first link voltage VI is from about 500V to about 2200V, e.g., the link voltage may be a selected or pre-determined static value within that range, or may be controllable within that range. As further illustrated in FIG. 1, the system also includes a controller 100 that is configured to communicate with the power source, e.g., alternator 40, and traction inverters 50, through communication links, which may be Ethernet or fiber optic based, although other communication protocols and cabling may be employed without departing from the broader aspects of the invention.

Figure 2:
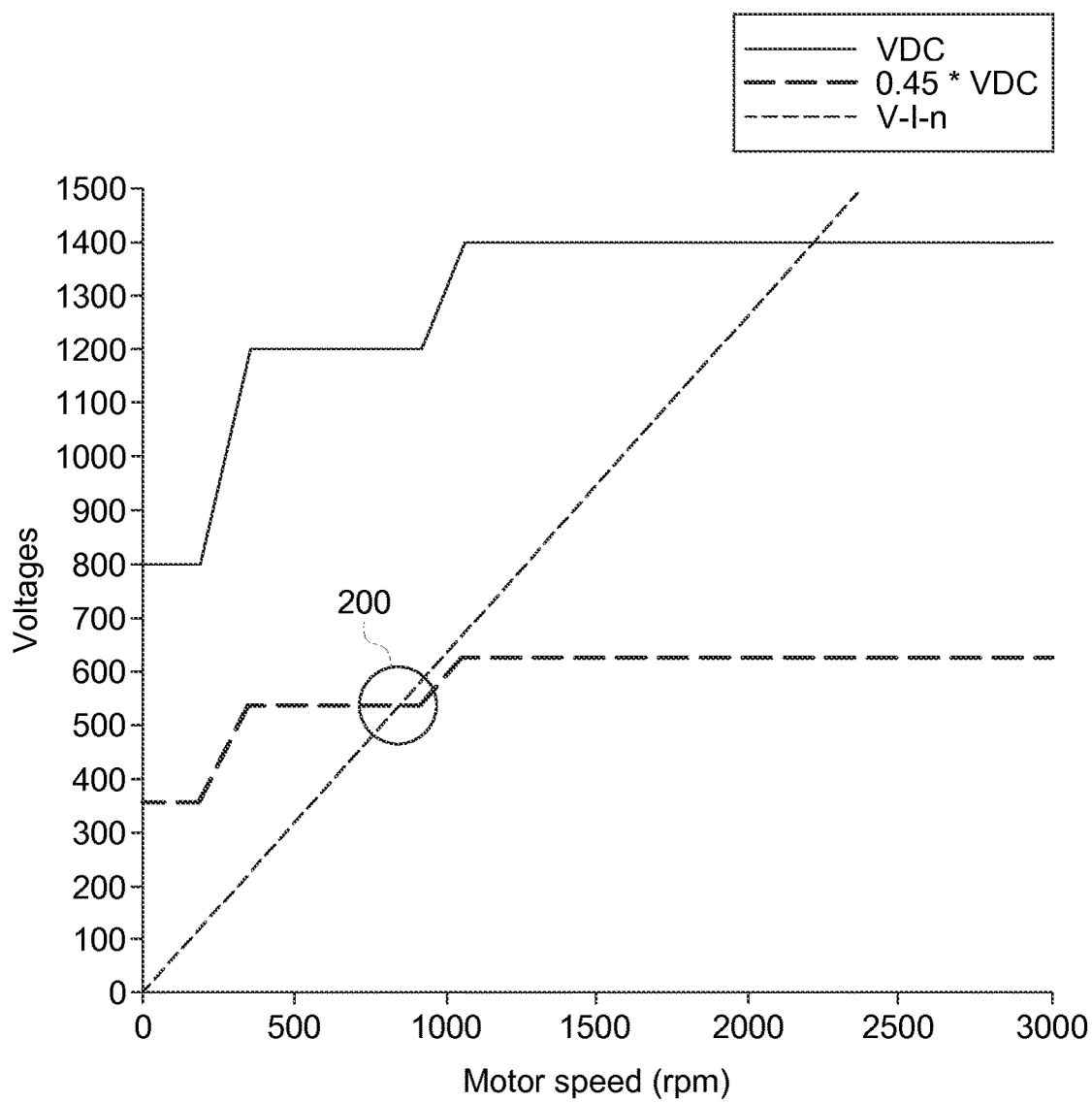
FIG. 2 is a chart depicting a typical link voltage curve.

Referring now to FIG. 2, a chart shows a typical link voltage curve in which the link voltage VDC is fixed and based on motor speed. As shown, where the V-l-n curve crosses the 0.45* VDC curve, denoted by reference number 200, the fundamental operating mode of the system changes. That is, the inverters will switch from pulse width modulation (PWM) to square wave modulation. This is referred to herein as the operating mode "changeover point." The changeover reduces the losses in the inverter but increases the losses in the motors to a greater extent and by extension reduces overall system efficiency. Presently, this significant change from PWM to square wave happens at the same speed, i.e., is fixed, regardless of ambient conditions or other considerations such as individual system component voltage efficiencies, which are collectively referred to herein as "efficiency parameters." Voltage efficiency generally refers to efficiency of a component at a particular input voltage, e.g., link voltage, which may be determined empirically or based on sensor data and/or assessment of system performance in different operating modes over time.

Utilizing fixed voltages can be inefficient as most systems are designed to operate reliably in worst-case conditions. For example, the predetermined link voltages may be based on thermal limitations at hot ambient conditions, which may not be present. As a result, opportunities to save fuel (and increase system efficiency) may exist where vehicles are operating at lower temperatures. Indeed, in an embodiment, link voltage and the inverter changeover point may be adjusted based on ambient temperature and thermal margin. For example, on a cold day when inverters can handle it, the inverters can run in the more efficient PWM mode for extended periods instead of switching into square wave mode at higher motor speeds.

Figure 3:
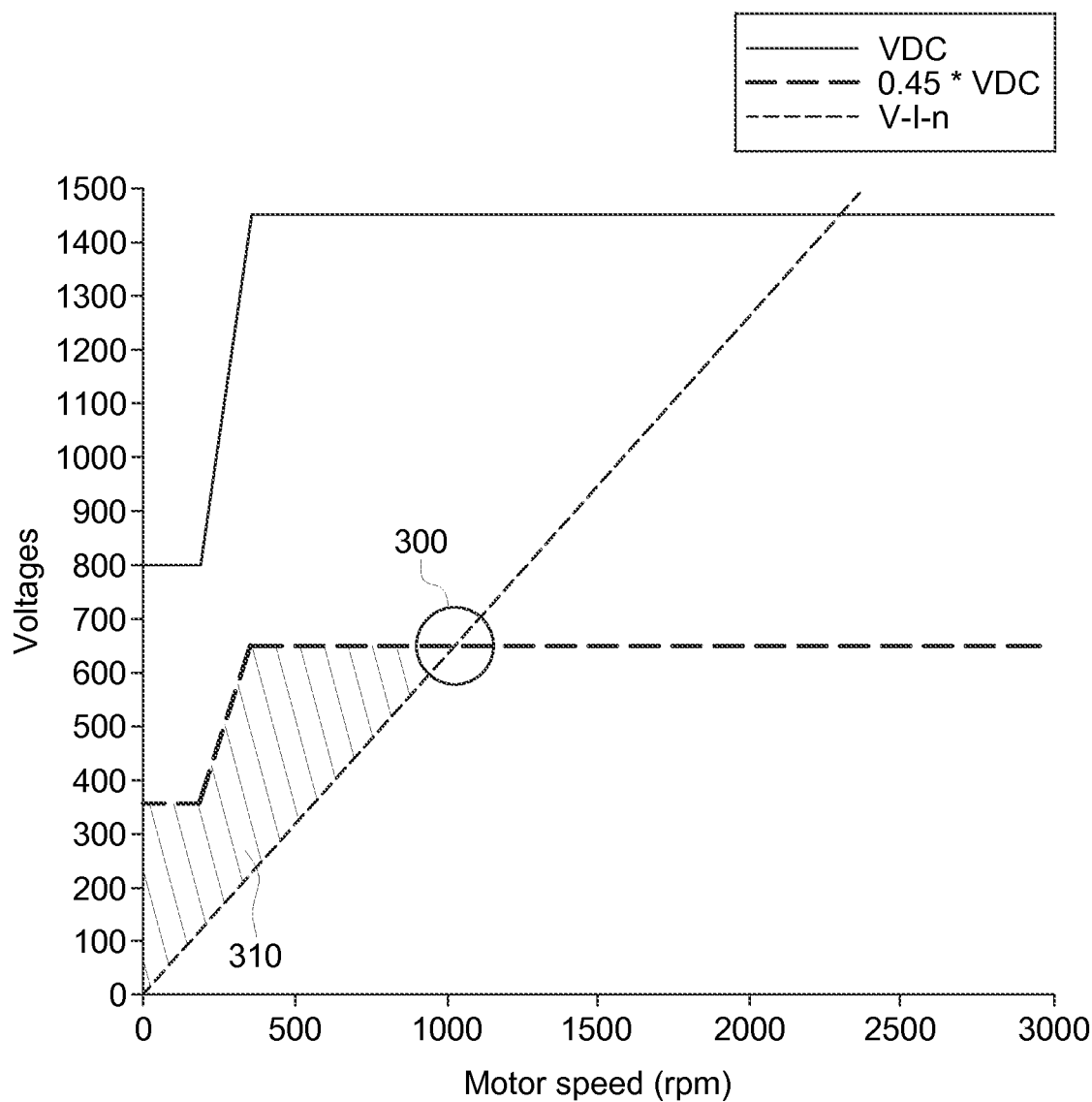
FIG. 3 is a chart depicting a link voltage curve according to an embodiment of the present invention.

As shown in FIG. 3, in embodiments of the invention, the system can be run in a more efficient mode, when the inverter is not thermally limited, by varying the link voltage, e.g., increasing it, and remaining in PWM. In the depicted embodiment, the link voltage has increased and the operating mode changeover point 300 has correspondingly moved to from ~750 rpm to 1000 rpm. By continuously varying the link voltage in real time, the inverter mode can be controlled at any speed within the acceptable limits for voltage and component temperature. As used herein, "real time" means the actual time during which something takes place (e.g., the controller 100 may vary the link voltage as input data is received). Link voltage also affects alternator and inverter efficiency for a given operating mode so this may also be taken into consideration.

In an embodiment, the link voltage, and operating mode, can be varied/controlled in real time by assessing optimal voltages of system components. That is, the highest total system efficiency is determined by the operating mode/point of three major components, the alternator, the inverter, and the traction motor. With respect to the alternator, this component's efficiency is dependent on system voltage (e.g., the rated and/or maximum voltage of the system) and current. However, the alternator may have an intermediate voltage where its efficiency is highest, and always using the highest or lowest possible voltage is generally not optimal.

Inverter efficiency is dependent on system voltage, and the minimum voltage required to achieve desired output is generally optimal. Inverter efficiency is also highly dependent on inverter mode and switching frequency. Likewise, the traction motor efficiency is highly dependent on inverter mode and switching frequency. The optimal point, however, is the inverse of what is optimal for the inverter. The motor, however, generally is the larger portion of system losses. For example, the system may have a link voltage range of, for example, 1000-1200V, for a given load and speed. Individual components within the system may operate optimally a certain points within the range, e.g., the alternator may operate most efficiently at 1175-1200V.

By assessing the optimal component voltages, the system can be run at the most efficient link voltage point while respecting thermal limits. As mentioned, for the alternator, in embodiments the alternator is operated at a voltage, such as an intermediate voltage, where its efficiency is highest, or at least higher than operation at other voltages. With respect to the inverter and traction motor, these components may be run at the lowest voltage that supports PWM and the switching frequency that minimizes losses for as long as the inverter can thermally support operation in this mode. In embodiments, when the inverter is thermally challenged such that the ambient temperature approaches a threshold, switching frequency can be lowered or the inverter operating mode shifted, which increases total system losses but transfers the majority of losses to the motor instead of the inverter which increases system efficiency.

Certain embodiments of the invention relate to retarding a vehicle. In retard, the only power from the engine is the power used to cool the components. The engine is run at the lowest speed necessary to save fuel, but is increased when components become hot. Which components heat up and how fast is determined by the motor speed dependent link voltage schedule. In embodiments, the link voltage schedule could be altered in real time to minimize losses in a hot component or change the distribution of losses between components. Additionally, switching frequency may be altered to balance losses between inverter and motor. This could be used to minimize the amount of time the engine speed needs to be elevated and therefore save fuel.

Referring again to FIG. 3, in certain embodiments of the invention, operating mode and link voltage may be varied to decrease losses at lower motor speeds. As shown therein, at lower speeds, e.g., ~0-650 rpm, more power is generated than is needed which is graphically represented by area 310. In this region, 0.45*VDC, i.e., the voltage put out, is greater than the line voltage. In embodiments, by varying the link voltage and changing operating mode, system efficiency can be increased.

The above-described methods and control strategies may be effectuated by a controller, e.g., controller 100, which includes electronic components or other hardware for varying link voltage. The controller may additionally include one or more sets of instructions or other software, stored on a tangible non-transitory medium and accessible/readable by the hardware. In embodiments, the instructions include an algorithm that may be implemented in software running on a processor (e.g., RISC). In certain embodiments, the controller may be operatively connected to sensors to detect ambient conditions, or other parameters, so that link voltage may be varied appropriately.

In an embodiment, a method is provided. The method includes the steps of selecting a link voltage based on voltage efficiencies of components in an electric drive motor system, and applying the link voltage to an inverter electrically coupled to a drive motor to increase system efficiency. In an embodiment, the components include at least an alternator, the inverter and the drive motor. In an embodiment, the step of selecting the link voltage may include assessing an optimal voltage for the alternator, inverter and drive motor. The optimal voltage for the drive motor and the inverter may be a lowest voltage that supports pulse width modulation. In an embodiment, the method may also include the step of identifying a switching frequency for the inverter and the drive motor that minimizes losses for as long as the inverter can thermally support. Moreover, in an embodiment, the method may also include the steps monitoring an ambient temperature, and lowering the switching frequency of the inverter or shifting an operating mode of the inverter when the ambient temperature exceeds a threshold. In an embodiment, the steps of selecting and applying the link voltage are carried out by a controller of the electric motor drive system and are carried out in real time. The electric motor drive system may provide motive power for an off-highway vehicle.

In an embodiment, a method is provided. The method includes the steps of selecting a link voltage based on ambient conditions of an electric drive motor system and applying the link voltage to an inverter electrically coupled to a drive motor to increase system efficiency. In an embodiment, the step of selecting the link voltage may include assessing the voltage efficiencies of components in the electric drive motor system. The components may include at least an alternator, the inverter and the drive motor. In an embodiment, an optimal voltage for the traction motor and the inverter is a lowest voltage that supports pulse width modulation. In an embodiment, the method may also include the step of identifying a switching frequency for the inverter and the drive motor that minimizes losses for as long as the inverter can thermally support. In an embodiment, the method may also include the step of lowering the switching frequency of the inverter or shifting an operating mode of the inverter when the ambient conditions of the electric drive motor system exceed a threshold.

In yet another embodiment, a method is provided. The method includes the steps of periodically selecting a link voltage based on an efficiency parameter of an electric drive motor system, applying the link voltage to an inverter of the system, and changing an operating mode of the inverter in response to the application of a selected link voltage. In an embodiment, the efficiency parameter is an ambient condition of the electric drive motor system. In another embodiment, the efficiency parameter is a voltage efficiency of a component in the electric drive motor system. The component may be at least one of an alternator, a traction motor and the inverter.

In an embodiment, an electric drive motor system is provided. The system includes a controller configured to periodically select a link voltage based on at least one efficiency parameter of the system and an inverter electrically coupled to the controller and to a motor. The inverter is configured to receive the selected link voltage. The inverter switches between pulse width modulation and square wave modulation to increase system efficiency, in response to receiving the selected link voltage. In an embodiment, the at least one efficiency parameter is an ambient condition of the electric drive motor system. In an embodiment, the at least one efficiency parameter is a voltage efficiency of a component in the electric drive motor system. In an embodiment, the component is at least one of an alternator, the motor and the inverter. In an embodiment, the system is configured to provide motive power for an off-highway vehicle.

In an embodiment, a method (e.g., a method of motor system control) includes selecting a link voltage based on voltage efficiencies of components in an electric drive motor system. The method further includes applying the link voltage to an inverter electrically coupled to a drive motor to increase system efficiency. For example, system efficiency may be increased relative to using a link voltage that is not selected based on voltage efficiencies of components in the electric drive motor system.

In an embodiment, an electric drive motor system includes a controller, an inverter, and a drive motor. The controller is configured to select a link voltage based on voltage efficiencies of components in the electric drive motor system. The controller is configured to apply the link voltage that is selected to the inverter, to increase system efficiency. The electric drive motor system may be part of an OHV or other vehicle, to provide motive power for the vehicle.

In an embodiment, a method (e.g., a method of motor system control) includes selecting a link voltage based on one or more ambient conditions of an electric drive motor system. The method further includes applying the link voltage to an inverter electrically coupled to a drive motor to increase system efficiency. For example, system efficiency may be increased relative to using a link voltage that is not selected based on voltage efficiencies of components in the electric drive motor system.

In an embodiment, an electric drive motor system includes a controller, an inverter, and a drive motor. The controller is configured to select a link voltage based on one or more ambient conditions the electric drive motor system. The controller is configured to apply the link voltage that is selected to the inverter, to increase system efficiency.

In an embodiment, a method (e.g., a method of motor system control) includes selecting (e.g., periodically selecting) a link voltage based on one or more efficiency parameters of an electric drive motor system. The method further includes applying the link voltage that is selected to an inverter of the system, and changing an operating mode of the inverter in response to the application of the link voltage that is selected. For example, changing the operating mode of the inverter may include switching the inverter between pulse width modulation and square wave modulation, to increase system efficiency.

In an embodiment, an electric drive motor system includes a controller, an inverter, and a drive motor. The controller is configured to select a link voltage based on one or more efficiency parameters of the system. The inverter is electrically coupled to the controller and to the motor, and is configured to receive the link voltage that is selected. At least one of the inverter or the controller is configured to change an operating mode of the inverter in response to application of the link voltage that is selected. For example, the system may be configured for the controller to control the inverter to change operating modes, and/or the inverter may be configured to automatically change operating modes responsive to link voltage. In an embodiment, change of operating modes of the inverter includes switching the inverter between pulse width modulation and square wave modulation, to increase system efficiency.

In any of the embodiments herein, a selected link voltage may be applied (e.g., to an electrical bus that connects to an inverter) by a controller controlling a power converter that is provided to generate the link voltage. For example, a system may include an engine or other prime mover, an alternator connected to the engine for generating electricity under operation of the engine, and a power converter connected to an output bus of the alternator for converting an electrical output of the alternator from one power format/ waveform to another. The power converter may include plural transistors or other power switches, which are configured to be controlled by a controller to select a particular voltage output and/or waveform that is output by the converter.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method comprising:
applying a first link voltage to an inverter electrically coupled to a drive motor in an electric drive motor system, the inverter at the first link voltage configured to switch from a first operating mode to a second operating mode at a first motor speed of the drive motor;
selecting a second link voltage that is different from the first link voltage based on one or more of (i) voltage efficiencies of one or both of the inverter or the drive motor, or (ii) an ambient temperature in the electric drive motor system, wherein the inverter at the second link voltage is configured to switch from the first operating mode to the second operating mode at a second motor speed of the drive motor, the second motor speed different from the first motor speed; and
applying the second link voltage to the inverter to have the inverter operate in the first operating mode for a different range of motor speeds of the drive motor before switching to the second operating mode relative to applying the first link voltage to the inverter.

2. The method according to claim 1, wherein:
the electric drive motor system also includes an alternator, the second link voltage being selected based on the component efficiencies of one or both of the inverter of the drive motor and a component efficiency of the alternator.

3. The method according to claim 2, wherein:
the step of selecting the link voltage includes assessing respective operating voltages for each of the alternator, inverter, and drive motor at which the alternator, inverter, and drive motor have respective peak efficiencies.

4. The method according to claim 3, wherein:
each of respective operating voltages for the drive motor and the inverter at which the drive motor and the inverter have the respective peak efficiencies is a lowest voltage that supports pulse width modulation of the inverter, wherein pulse width modulation represents the first operating mode of the inverter.

5. The method according to claim 1, wherein:
the steps of selecting and applying the second link voltage are carried out by a controller of the electric drive motor system and are carried out in real time.

6. The method according to claim 1, wherein:
the electric drive motor system provides motive power for a vehicle.

7. The method according to claim 1, wherein the first operating mode of the inverter is pulse width modulation mode and the second operating mode is square wave modulation mode.

8. The method according to claim 1, wherein the second link voltage is greater than the first link voltage.

9. The method according to claim 1, wherein the second motor speed of the drive motor is greater than the first motor speed such that applying the second link voltage to the inverter causes the inverter to operate in the first operating mode for a greater range of motor speeds of the drive motor before switching to the second operating mode relative to applying the first link voltage.

10. A method, comprising the steps of:
applying a first link voltage to an inverter electrically coupled to a drive motor in an electric drive motor system, the inverter at the first link voltage configured to switch from a first operating mode to a second operating mode at a first motor speed of the drive motor;

responsive to detecting an ambient temperature in the electric drive motor system below a designated threshold temperature, selecting a second link voltage that is greater than the first link voltage, wherein the inverter at the second link voltage is configured to switch from the first operating mode to the second operating mode at a second motor speed of the drive motor, the second motor speed greater than the first motor speed; and applying the second link voltage to the inverter to have the inverter operate in the first operating mode for a greater range of motor speeds of the drive motor before switching to the second operating mode relative to applying the first link voltage to the inverter.

11. The method according to claim 10, wherein:
the step of selecting the second link voltage also includes assessing voltage efficiencies of components in the electric drive motor system.

12. The method according to claim 11, wherein:
the components include at least an alternator, the inverter, and the drive motor.

13. The method according to claim 12, wherein:
the second link voltage is further selected based on a lowest voltage that supports pulse width modulation of the inverter, wherein pulse width modulation represents the first operating mode of the inverter.

14. The method according to claim 10, wherein the first operating mode of the inverter is pulse width modulation mode and the second operating mode is square wave modulation mode.

15. An electric drive motor system, comprising:
an inverter electrically coupled to a power converter and to a motor; and
a controller operably coupled to the power converter and configured to control the power converter to apply a first link voltage to the inverter, the inverter at the first link voltage configured to switch from a first operating mode to a second operating mode at a first speed of the motor,
wherein, responsive to detecting an ambient temperature in the electric drive motor system below a designated threshold temperature, the controller is configured to select a second link voltage that is different than the first link voltage, the inverter at the second link voltage configured to switch from the first operating mode to the second operating mode at a second speed of the motor, the second speed different than the first speed, and
wherein, after selecting the second link voltage, the controller is configured to control the power converter to apply the second link voltage to the inverter to have the inverter operate in the first operating mode for a different range of speeds of the motor before switching to the second operating mode relative to applying the first link voltage to the inverter.

16. The electric drive motor system of claim 15, wherein the first operating mode of the inverter is pulse width modulation mode and the second operating mode of the inverter is square wave modulation mode.

17. The electric drive motor system of claim 15, further comprising a sensor configured to generate temperature measurements, the controller operably coupled to the sensor and configured to detect when the ambient temperature is below the designated threshold temperature based on the temperature measurements generated by the sensor.

18. The electric drive motor system of claim 15, wherein the controller is configured to select the second link voltage to be greater than the first link voltage, and the controller is configured to control the power converter to apply the second link voltage such that the second speed of the motor is greater than the first speed to cause the inverter to operate in the first operating mode for a greater range of speeds of the motor before switching to the second operating mode relative to applying the first link voltage.

19. The electric drive motor system of claim 15, wherein, subsequent to the controller controlling the power converter to apply the second link voltage to the inverter, in response to detecting that the ambient temperature in the electric drive motor system is at or above the designated threshold temperature, the controller is configured to control the power converted to apply the first link voltage to the inverter.

20. An electric drive motor system, comprising:
an inverter electrically coupled to a power converter and to a motor; and
a controller operably coupled to the power converter and configured to control the power converter to apply a first link voltage to the inverter, the inverter at the first link voltage configured to switch from a pulse width modulation mode to a square wave modulation mode at a first speed of the motor,
wherein, responsive to detecting an ambient temperature in the electric drive motor system below a designated threshold temperature, the controller is configured to select a second link voltage that is different than the first link voltage, the inverter at the second link voltage configured to switch from the pulse width modulation mode to the square wave modulation mode at a second speed of the motor, the second speed different than the first speed, and
wherein, after selecting the second link voltage, the controller is configured to control the power converter to apply the second link voltage to the inverter to have the inverter operate in the pulse width modulation mode for a different range of speeds of the motor before switching to the square wave modulation mode relative to applying the first link voltage to the inverter.

* * * * *